United States Patent [19]
Charbonneau et al.

[11] 3,942,424
[45] Mar. 9, 1976

[54] PUMP FOR COFFEE BREWING DEVICE

[75] Inventors: George M. Charbonneau, Big Flats; Leslie C. Cummings, Dundee, both of N.Y.

[73] Assignee: Corning Glass Works, Corning, N.Y.

[22] Filed: Oct. 15, 1974

[21] Appl. No.: 514,722

[52] U.S. Cl.................................. 99/313; 417/208
[51] Int. Cl.²......................................... A47J 31/00
[58] Field of Search............ 99/308, 309, 310, 311, 99/312, 313, 314, 315; 417/207, 208, 209

[56] References Cited
UNITED STATES PATENTS

| | | | |
|---|---|---|---|
| 3,333,087 | 7/1967 | Manship | 99/310 |
| 3,439,602 | 4/1969 | Gazzo | 99/312 |

*Primary Examiner*—Robert W. Jenkins
*Attorney, Agent, or Firm*—Burton R. Turner; Clarence R. Patty, Jr.

[57] ABSTRACT

A coffee maker pump for conveying fluid from a well area to a container for coffee grounds is provided with a restricted outlet opening for controlling the delivery of such fluid to the grounds in said container, and a by-pass opening intermediate the ends of said pump for relieving back pressure therewithin produced by said restriction. The amount of water which is supplied to the coffee grounds by said pump may be controlled by changing the size of the outlet restriction, or the size of the by-pass opening, or both thereby changing the back pressure in the pump stem which directly effects the amount of water delivered by the outlet end to the grounds retained within the container.

5 Claims, 3 Drawing Figures

PUM FOR COFFEE BREWING DEVICE

BACKGROUND OF THE INVENTION

This invention pertains to the art of coffee making, and more particularly to the construction and operation of a pump utilized in coffee percolators.

In a percolator for brewing coffee, water is heated in a container and passed upwardly through a pump stem to a basket or retainer containing coffee grounds. The heated water is passed through the bed of coffee grounds retained within the basket to extract the flavor therefrom and produce a palatable brew. During the brewing cycle, water is heated in a well at the bottom of the container to its boiling temperature and forced upwardly through the pump stem of a pump positioned within such well and discharged at its upper end for flow into a bed of coffee grounds retained within a basket positioned adjacent the upper end of such pump. The quality of the brew produced, as the water filters downwardly through the coffee media to extract the essence thereof, is dependent upon the time period during which the water is circulated through the grounds, the temperature of the water as it is passed therethrough, and the quantity of the coffee and water utilized. The present invention is particularly directed to the control of the volume of water which is passed through the coffee bed so as to produce a high quality of brewed coffee. If too much water is provided, undesirable compounds will be extracted from the coffee grounds producing an unpalatable brew, and flooding of the grounds may occur resulting in the obtainment of undesirable sediment within the brewed coffee. If, on the other hand, too little water is utilized, an underdeveloped or weak brew will result.

Accordingly, the instant invention has overcome the problem of controlling the volume of water which is passed through the coffee grounds in a conventional perking operation, by providing a correct volume of water to such grounds during each timed cycle to thereby produce a quality brew.

SUMMARY OF THE INVENTION

In its very simplest form, the present invention is directed to an improved pump for use in a coffee percolator which controls the amount of water delivered to coffee grounds retained within a basket or container. The pump has an outlet orifice at its upper end which is provided with a restriction so as to produce a back pressure within the pump, and a bypass opening is provided in the side of the pump to relieve the back pressure and permit a controlled amount of water to pass outwardly therethrough for recycling into the main body of water without passing through the grounds, and thereby control the amount of water which actually passes through the coffee bed.

It thus has been an object of the present invention to provide a novel relatively easily manufacturable pump assembly for a coffee percolator which, without any moving parts, controls the volume of water supplied to and passed through a bed of coffee grounds for consistently obtaining an improved palatable brew with each timed cycle of the coffee maker.

DESCRIPTION OF THE PREFERRED EMBODIMENTS

Figure 1:
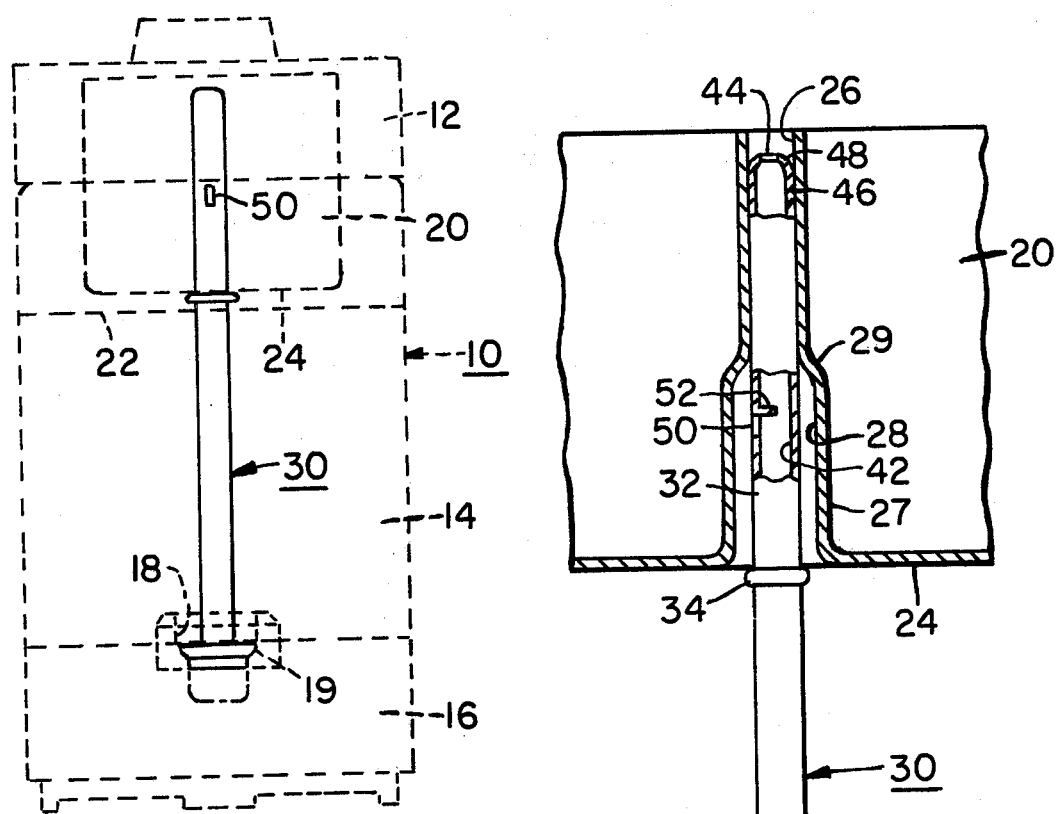
FIG. 1 is a somewhat schematic view of a coffee maker containing the improved pump assembly of the present invention.

Referring now to FIG. 1, an electric percolator is schematically shown at 10, including an upper cover portion 12, a container or bowl portion 14 for retaining liquid, and a base portion 16 which may include conventional heating elements. The base portion 16 has a heating well 18 provided in its upper surface, which communicates with the bowl or container portion 14. A basket or retainer 20 for containing coffee grounds is shown positioned upon a pump assembly 30, which in turn is positioned within the well 18. The maximum operable level of fluid, such as water, which may be maintained within container 14 is shown at 22, and as will be noted in FIG. 1, such level is below the level of the bottom wall 24 of basket 20.

Figure 2:
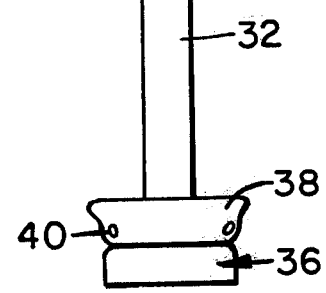
FIG. 2 is a side elevational view, partially in section, of the improved pump assembly of the present invention shown in position within a fragmental portion of a basket or coffee ground container.

As shown more clearly in FIG. 2, the basket 20 has a central opening 26 extending upwardly from the bottom wall 24 for receiving a stem portion 32 of the pump assembly. The bounding walls 27 about the lower portion of central opening 26 are expanded outwardly to provide a passageway 28 between the stem portion 32 and the expanded lower portion 27. Collar means 34 is provided on stem portion 32 for flexibly retaining basket 20 on the pump assembly 30 through the utilization of spring means, not shown, which operatively cooperates with the collar means 34 and a shoulder means 29 intermediate the ends of central opening 26 of basket 20.

The pump assembly 30 has a foot or base portion 36 secured to its lowered end which fits downwardly within heating well 18. The base portion 36 has an outwardly flared dish portion 38 which cooperatively engages with a flange 19 of well 18 (see FIG. 1) to retain the base portion 36 in spaced relation from the bottom of the well 18. A plurality of openings 40 are provided within the dish portion 38 in order to supply the lower heating portion of well 18 with water from the container 14.

Figure 3:
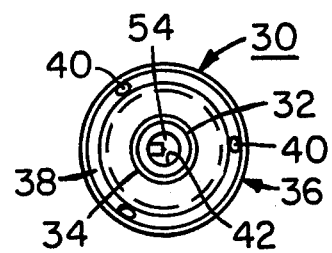
FIG. 3 is a top plan view of the pump assembly.

As shown in FIGS. 2 and 3, the pump assembly 30 is provided with a longitudinally extending central passageway 42 which extends the length of stem portion 32 from the foot portion 36 at its lower end to a restricted outlet opening 44 at its upper end. As will be noted particularly in FIG. 2, the walls 46 of stem portion 32 are curved inwardly at the upper end 48 of the stem 32 to provide the restricted outlet opening 44. A side by-pass or relief opening 50 is provided through the walls 46 of stem 32 intermediate its upper and lower extent. Although the side opening 50 may be formed by any suitable manner, when punched it may leave a pressed-in tab 52. As shown in FIG. 2, the side opening 50 communicates with the passageway 28 formed in the lower portion 27 of central opening 36 extending through basket 20. Further, as shown in FIG. 1, the side opening 50 is positioned above the maximum operable water level 22 within container 14.

In operation, with the pump assembly 30 positioned within heating well 18 and basket member 20 operatively mounted upon pump assembly 30, water from container 14 is fed by gravity into the lower portion of heating well 18 by means of openings 40 formed in the dish portion 38 of base portion 36. The water is heated by conventional means and forced up the longitudinally extending central passageway 42 of pump stem 32 and outwardly through restricted opening 44 formed in the upper end portion 48 of the pump stem. The water is then directed to coffee grounds retained within basket 20 and filters downwardly therethrough extracting the essence therefrom, with the brew flowing downwardly through conventional openings in the bottom wall 24 of the basket 20 back into the container 14. However, the restricted opening 44 controls the flow of the water to the grounds within the basket and prevents detrimental surges and flooding of the grounds, by building up a back pressure within the pump stem and allowing only a controlled flow of water through the outlet opening 44 to the coffee grounds. Side opening 50, relieves the back pressure provided by the restricted opening 44 and a controlled amount of liquid passes through the by-pass side opening 50 downwardly through the passageway 28, formed in the lower portion 27 of central opening 26, countercurrent to flow within the pump stem and downwardly into the liquid retained in container 14, without having passed through the coffee grounds retained in basket 20. Thus, the amount of water passing through the grounds can be controlled by changing the size of the outlet restriction 44, the size of the bypass hole or slot 50 formed in the side of the stem, or both, thereby varying the back pressure in the pump stem 32 and regulating the volume of water permitted to flow through outlet opening 44 in a given time cycle.

Although we have disclosed the utilization of our improved pump assembly in connection with an automatic electric coffee maker, it will be apparent that the same principle may be utilized with a stove top coffee maker wherein the time and temperature of the brewing cycle may be manually regulated. It is further understood that various changes and modifications may be made to the preferred embodiments disclosed herein without departing from the spirit and scope of the invention as defined in the appended claims.

We claim:

1. An improved coffee maker pump assembly for controlling the volume of water delivered to coffee grounds for extracting a brew therefrom which comprises, a stem portion, a base portion connected to said stem portion adjacent one end thereof, a passageway extending longitudinally within said stem portion, inlet means adjacent said base portion for supplying water to said passageway, restricted outlet means formed in said stem portion and communicating with said passageway for controlling the volume of flow from said passageway delivered to coffee grounds retained exteriorly of said passageway during a brewing period and for simultaneously providing a back pressure within said passageway while delivering such flow from said outlet means, and relief means formed in said stem intermediate said restricted outlet means and said base portion for relieving back pressure within said passageway and for discharging fluid therefrom for flow countercurrent to flow within said passageway.

2. A pump assembly as defined in claim 1 wherein said restricted outlet means is positioned adjacent an end of said stem portion opposite to the end connected to said base portion.

3. A pump assembly as defined in claim 1 wherein said relief means is an opening extending through a side wall of said stem portion and communicating with said passageway at a level above the surface of a supply of water feeding said inlet means.

4. In a coffee maker for percolating coffee by forcing water from a container thereof upwardly through a pump for discharge into a basket containing coffee grounds wherein the water seeps through such grounds extracting the essence thereof as it flows downwardly into the container of water to form a coffee brew, the improvement comprising a pump assembly having a stem portion and a base portion, said base portion being connected to a bottom end of said stem portion, a passageway extending longitudinally within said stem portion, inlet means communicating with said passageway adjacent said base portion for supplying water to said passageway from a bottom portion of the container for said water, restricted outlet means formed in said stem portion and communicating with said passageway adjacent the top end of said stem portion for controlling the volume of water discharged by said passageway to coffee grounds contained within a basket positioned about an upper portion of said stem during a timed perking cycle and for providing back pressure within said passageway while simultaneously discharging said water to said coffee grounds, by-pass means formed in a side wall of said stem portion below said outlet means for relieving back pressure built up within said passageway by said restricted outlet means as water is discharged from said outlet means, and said by-pass means being positioned above the level of the water retained by said water container.

5. In a coffee maker as defined in claim 4 wherein said by-pass means cooperates with said restricted outlet means to control the amount of liquid delivered from said passageway to said coffee grounds within said basket during the timed perking cycle, and said by-pass means includes an opening in said stem portion for discharging liquid from said passageway above the level of the bottom of said basket without passing through the coffee grounds retained by said basket.

* * * * *